United States Patent [19]

Horn et al.

[11] Patent Number: 4,727,014

[45] Date of Patent: Feb. 23, 1988

[54] PROCESS FOR THE PRODUCTION OF A STANDARD CALIBRATION AND TEST ELEMENT, AND A STANDARD CALIBRATION AND TEST ELEMENT PRODUCED BY THE PROCESS

[75] Inventors: Klaus Horn, Hofheim/Ts; Georg Sader, Huenstetten; Hans-Joachim Schulz; Michael Roethe, both of Wiesbaden, all of Fed. Rep. of Germany

[73] Assignee: Hoechst Aktiengesellschaft, Frankfurt am Main, Fed. Rep. of Germany

[21] Appl. No.: 941,200

[22] Filed: Dec. 12, 1986

[30] Foreign Application Priority Data

Dec. 14, 1985 [DE] Fed. Rep. of Germany ....... 3544299

[51] Int. Cl.[4] .................... G03F 7/16; G01N 21/84
[52] U.S. Cl. ............................ 430/321; 430/323; 430/329; 428/209; 428/469; 156/659.1; 356/394; 356/398
[58] Field of Search ............. 430/313, 314, 318, 319, 430/321, 323, 325, 329; 428/209, 469; 156/659.1, 666; 356/237, 394, 398; 204/192.1; 427/250, 431, 433, 443.1

[56] References Cited

U.S. PATENT DOCUMENTS 3,506,441 4/1970 Gottfried ........................... 430/319
4,193,797 3/1980 Cohen et al. ....................... 430/323

Primary Examiner—John E. Kittle
Assistant Examiner—Terry J. Owens
Attorney, Agent, or Firm—Schwartz, Jeffery, Schwaab, Mack, Blumenthal & Evans

[57] ABSTRACT

To produce a standard calibration and test element for the calibration and testing of reading and measuring instruments for bar codes and other test scales, a copper coating is applied to a ceramic substrate in a chemically depositing copper bath and degreased, and a photoresist coating is subsequently applied which is exposed through an exposure mask. This mask carries an image of the radiation-transparent and radiation-opaque regions of a pattern to be transferred onto the surface of the ceramic substrate. After removal of the mask, the photoresist coating is developed, the uncovered zones of the copper coating are etched in a metal chloride solution, and the remaining photoresist coating is removed by stripping. The uncovered, etched zones of the copper coating are dyed matt black in a metal bath. Finally, the conductive tracks are provided with a protective coating. The standard calibration and test element produced in this fashion comprises a ceramic substrate 1 as a carrier which contains a proportion of 96 to 97% of $Al_2O_3$. The thickness of the element is 0.635 to 1.270 mm and the dimensions can extend from a 20 mm edge length to a size of 100×100 mm.

25 Claims, 10 Drawing Figures

EXPOSED THROUGH
EXPOSURE MASK

CONDUCTIVE COPPER
TRACKS DYED BLACK
AND PROVIDED WITH
A PROTECTIVE COATING

RESIST
STRIPPED

COATED WITH
RESIST

CONDUCTIVE COPPER
TRACKS ETCHED

NON-CURRENT
COPPER-PLATED

RESIST
DEVELOPED

PROCESS FOR THE PRODUCTION OF A STANDARD CALIBRATION AND TEST ELEMENT, AND A STANDARD CALIBRATION AND TEST ELEMENT PRODUCED BY THE PROCESS

BACKGROUND OF THE INVENTION

The invention relates to a process for the production of a standard calibration and test element for the calibration and testing of reading and measuring instruments. The invention further relates to a standard calibration and test element produced by the process.

For the machine-readable identification marking of goods, particularly food articles (which are packed in a very wide variety of shapes and materials), of books and other mass-produced articles, internationally introduced codes, which are in general bar codes containing coded information on the country of origin, article numbers, price information and further data by means of different bar thicknesses, lengths, separations and the like, are becoming generally accepted to an increasing extent. In the case of codes for the identification marking of books, for example paperbacks, such data as publisher, price, title, year of publication, edition number, language and the like are coded above all.

When these codes are read by machines, for example, in so-called scanner registers, this information is decoded and printed out in clear text on the receipt and also, in many cases, simultaneously transferred to a central computer which manages all the stockkeeping. Besides the scanners which are permanently built-in to data registers, pen-like readers are also employed for decoding bar codes, in which case these pen-like readers may be connected to the data register, and also additionally to a monitor via flexible cables.

The specifications for printing the various codes propose dark stripes or bars and pale gaps; the contrast specifications, however, are only valid for the wavelength range in which the light source employed for the decoding works. The scanners integrated into data registers use laser beams, from which it follows that the color information for light and dark must relate to the value of the wavelength which is generated by the laser. This means that the gaps in the bar code are "light" for the laser scanning if the gaps have a color which corresponds to the wavelength of the laser. The other regions of the bar code, for example, the bars, then appear "dark" for the laser light. These considerations lead, for example, in the case of glass as a packaging material, to the fact that the glass material as such, which does not reflect, but instead transmits the laser beams at non-printed points, adopts the function of the bars or stripes. The light gaps are then printed onto the glass material in a color which corresponds to the laser light.

For the packaging industry which produces folding cartons, bar codes are generally obtained from printers. For small runs of bar codes, label printers are available which produce bar code labels of paper, metal and plastic and which operate as thermoprinters, matrix printers or laser printers. For measuring and testing the printed bar codes, appropriate measuring and testing instruments are available which also enable color contrast measurements.

For article numbering, the substantially similar EAN and JAN bar codes have become generally accepted world-wide, with the exception of the United States of America. These form the basis of EUROPEAN ARTICLE NUMBERING and JAPANESE ARTICLE NUMBERING, which were designed by the International Article Numbering Association.

A spread of the bar code quality is unavoidable during the production of bar codes by printing, but should be kept as small as possible in order to achieve the clearest possible reading by machines of the bar codes. However, the success of machine reading is not dependent just on the bar code quality, but also on the bar code reader employed, in which, for example, performance fluctuations caused by wear of individual components, such as the laser, the main voltage stabilization unit and the like, can occur. In addition, in practice external influences also act on the bar code, for example, contamination of the packaging material in the region of the bar code, which limits the readability of the bar code.

In printing and reproduction technology, grid scales, exposure test wedges and similar standards, which are constructed similarly to the stripe or bar codes, are used for calibration and quality testing purposes.

Standard, bar and test plates on glass slides are known which comprise zones which are transparent and opaque for polychromatic light, i.e., white light. Lasers, which emit a certain wavelength, are generally not well suited as radiation sources for reading the standard, bar and test plates, since the contrast differences between the glass, which is transparent to white light, and the grating scales and patterns of lines and bars on the plates, which are opaque to white light, are inadequate for the laser light.

In the case of reading and test instruments which work with polychromatic light of a white light source or with monochromatic light of a laser, errors can be caused during the machine identification of bar codes due to performance fluctuations of individual components of the instrument. In addition, specific differences in the machine reading of the bar codes into clear text can occur in the case of instruments from different manufacturers, since each manufacturer tests and adjusts his instruments according to his own bar code models. The test models here can be applied to different materials, such as glass, film, transparent paper, cardboard or the like, which possess thermal, mechanical and optical properties differing from one another. These specific material properties can cause slight deviations during the clear text reading of one and the same bar code by testing instruments and readers of different manufacturers.

SUMMARY OF THE INVENTION

It is an object of the present invention to provide a process for the production of a standard calibration and test element having high-contrast bar codes of constant shape.

Another object of the present invention is to provide a process for the production of a test element as aforementioned, wherein the test element has a high dimension stability.

A further object of the present invention is to provide a process for the production of a test element as mentioned above, which process can be performed at a low price.

It is still a further object of the present invention, to make available a standard calibration and test element having high-contrast for codes of constant shape and a high dimension stability, the test element being suitable for the calibration and testing of reading and measuring instruments.

Additionally, it is an object of the present invention to provide a method of checking the reading accuracy of a test instrument or a data register comprising a scanner, which method also is suitable to exactly calibrate said test instrument or data register.

In accomplishing the foregoing objects, there has been provided in accordance with one aspect of the present invention a process for the production of a standard calibration and test element for calibration and testing of reading and measuring instruments, comprising the steps of (i) applying a metal coating to at least one surface of a ceramic substrate; (ii) degreasing the surface of the metal coating; (iii) applying a photoresist coating to the degreased surface of the metal coating; (iv) exposing the photoresist coating through a mask comprising an image of radiation-transparent and radiation-nontransparent zones of a pattern to be transferred; (v) developing the exposed photoresist to thereby produce first zones in which the metal coating remains covered by the photoresist and second zones in which the metal coating is uncovered; (vi) etching the uncovered zones of the metal coating; (vii) removing the photoresist coating from the covered zones and producing thereby etched zones and nonetched zones in the metal coating; and (viii) dyeing the etched zones of the metal coating matt black.

In accordance with another aspect of the present invention, there has been provided a standard calibration and test element produced by the foregoing process, comprising a ceramic substrate and a metal coating on at least one surface of the ceramic substrate, wherein the ceramic substrate is comprised of at least about 96% by weight of $Al_2O_3$, calculated on total weight of the ceramic substrate, and wherein the metal coating carries a pattern on its surface.

According to still another aspect of the present invention, there has been provided a method of testing and calibrating the reading accuracy of a scanner incorporated into a test instrument or data register, comprising the steps of scanning a standard calibration and test element as defined above and testing whether the scanner or light pen correctly reproduces the standard imprinted on the standard test element.

Further objects, features and advantages of the present invention will become apparent from the detailed description of preferred embodiments which follows, when considered together with the attached figures of drawing.

DETAILED DESCRIPTION OF THE PREFERRED EMBODIMENTS

Figure 1:
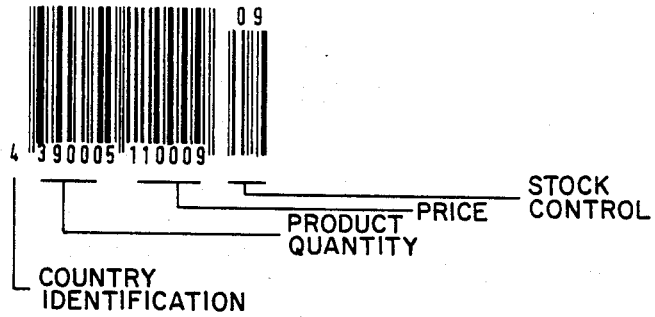
FIG. 1 shows a schematic view of the EAN code.

According to the present invention, a metal coating is applied to a ceramic substrate. The metal coating is then degreased and liquid or dry film photoresist coating is applied and exposed through a mask which carries an image of the radiation-transparent and radiation-nontransparent zones of a pattern to be transferred. The photoresist coating is developed after removal of the mask. The uncovered zones of the metal coating are etched in a solution, and the remaining photoresist coating is removed. Finally, the uncovered, etched zones are dyed matt black in a metal bath. In order to ensure that very tight dimensional tolerances are maintained, the ceramic substrate contains a proportion greater than or equal to about 96% by weight of aluminum oxide, calculated on the total weight of the ceramic substrate. In carrying out the process, the ceramic substrate is produced by dry pressing, or punching from a solid ceramic block, or by laser working.

The ceramic substrate of the standard calibration and test element according to the present invention is an aluminum oxide ceramic having a proportion of about 96–97% of $Al_2O_3$, a thickness of about 0.635 to about 1.27 mm and having dimensions of from about a 20 millimeter edge length up to a size of about 100×100 mm. The substrate carries a pattern on its surface.

The invention achieves the advantage that a standard calibration and test element—for the calibration and testing of reading and measuring instruments for bar codes, grid scales or exposure test wedges—which satisfies all the mechanical and optical demands regarding the dimensional accuracy and the contrast differences between radiation-transparent and radiation-nontransparent regions, can be produced in an economical fashion.

The process and a standard calibration and test element produced by the process are described below in greater detail with reference to an exemplary embodiment represented in the drawings.

In FIG. 1, the EAN bar code for the EUROPEAN ARTICLE NUMBERING, which comprises several identification fields (for example, for the country identification, the goods and quantity identification and also for further data, such as, for example, the production date, expiry date or similar data) is represented schematically. The different bar thicknesses, separations and lengths in the individual identification fields represent the above information in coded form. They are decoded on reading by means of a light pen or a laser and are reproduced as clear text. The EAN bar code represented schematically in FIG. 1 is a representative of further internationally introduced bar codes, such as, for example, the JAN bar code, which relates to the JAPANESE ARTICLE NUMBERING and is widely distributed in Asia. Besides these article numbering codes, there are a number of further internationally standardized codes, such as, for example, the INTERNATIONAL STANDARD BOOK ARTICLE NUMBERING, ISBN coding, which is used for identification of books with respect to the publisher, the price, the article, the edition number, the language, the year of publication and similar information.

Figure 2:
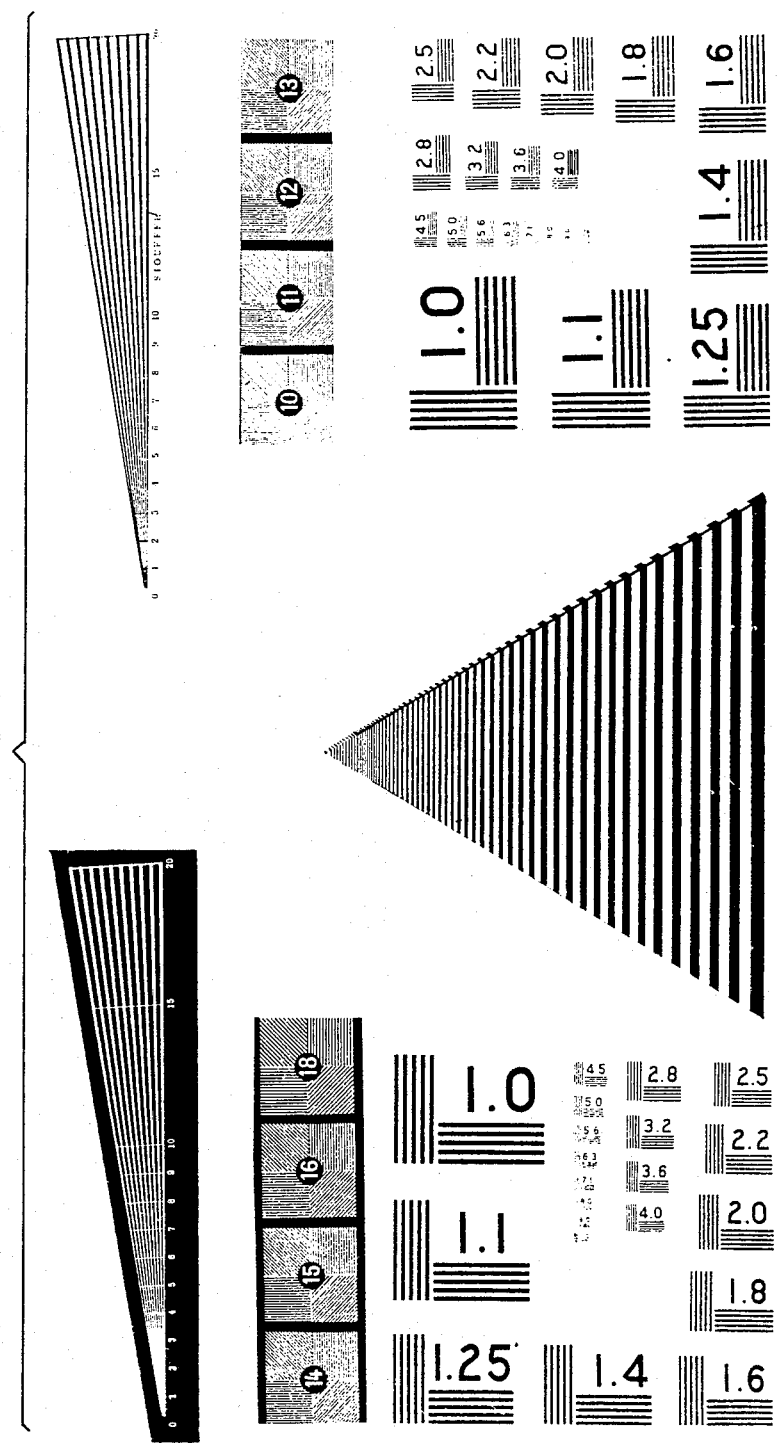
FIG. 2 shows a section of a test chart for a printing plate.

FIG. 2 shows schematically a section of a test chart for a printing plate which is exposed onto the latter and developed, in order to enable testing and assessment of the print quality to be expected. Such test charts can also be exposure test wedges having graduated exposure steps, as are used in printing and reproduction technology for densitometric measurements.

The individual process steps for the production of a standard calibration and test element according to the present invention are described with reference to the schematic representations in FIGS. 3(a) to 3(g). A ceramic substrate having a proportion of aluminum oxide greater or equal to 96% is metal plated, without current (electroless), in the process step according to Figure 3(a) by introducing the ceramic substrate into a chemically depositing metal bath, such as, for example, a copper bath. The metal coating can also be applied by sputtering or evaporation in vacuo. A conductive copper coating is deposited without current as a metal coating having a thickness of up to 3 $\mu$m on the surface of the ceramic substrate. The ceramic substrate is preferably a standard ceramic material for the electronic industry, such as produced by HOECHST Ceram Tec for thick-film and thin-layer circuits. Such ceramic substrates are produced with extremely high-grade surfaces which have a fine-grained, uniform texture under constant, very precise control of the raw materials and of the production process under clean-room conditions. The ceramic substrate is produced by dry pressing or punching from a solid ceramic block, or by laser working.

Figure 3C:
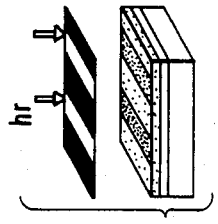
FIGS. 3(a) to (g) show a schematic representation of the individual process steps for the production of a standard calibration and test element.
Figure 3G:
Figure 3F:
Figure 3B:

The metal coating deposited on the surface of the ceramic substrate as a conductive copper coating is degreased and coated with a positive or negative liquid or dry film photoresist coating in the process step according to FIG. 3(b). In the present case, a positive liquid photoresist is preferably used, the solubility of which is increased in the irradiated regions in the case of radiation treatment.

In the process step according to FIG. 3(c), the photoresist coating is covered with a photo or irradiation mask which carries an image of the radiation-transparent and radiation-opaque regions of a pattern to be transferred. This pattern is an internationally introduced bar code, such as, for example, the EAN bar code according to FIG. 1, wherein, however, the individual identification fields of this code correspond to a fixed standard. This standard can be designed, inter alia, so that the numbers 0 to 9 in an increasing or decreasing sequence are contained in each identification field of the bar code, or such that only the numbers zero or one other number between 1 and 9 are exclusively contained in each identification field.

The irradiation through the irradiation mask alters the solubility of the photoresist coating under the transparent zones of the mask in such a fashion that, in the case of a positive photoresist coating, the solubility of the resist coating under the transparent zones of the exposure mask increases, i.e., the photoresist coating is removed selectively during subsequent developing using an appropriate developing liquid, for example, an aqueous-alkaline or solvent-type developer, in order to uncover the substrate surface in these zones and to thereby make it accessible to further selective treatment. This developing step is reproduced schematically in FIG. 3(d). If the photoresist coating is a negative photoresist, it is hardened under the transparent zones of the irradiation mask so that after removal of the mask the developer selectively removes those regions of the photoresist coating which were below the non-transparent zones of the irradiation mask during the exposure. Thus, in the case of a positive photoresist, the uncovered, unprotected substrate surfaces correspond to the transparent zones of the irradiation mask, and in the case of negative photoresist, they correspond to the radiation-nontransparent regions of the mask structure.

Figure 3E:
Figure 3A:
Figure 3D:

The next process step, in which the uncovered zones of the metal coating are etched in a solution, is represented in FIG. 3(e). To this purpose, for example, a cold (room temperature) iron-(III) chloride solution is used which etches the uncovered metal tracks in the developed photoresist coating in the conventional manner. The etching can also be carried out in acidic or ammoniacal copper solution. The remaining photoresist coating is subsequently removed by stripping in accordance with well known techniques, as represented in FIG. 3(f). The stripping agents employed are lye for photoresists developed with aqueous-alkaline solutions and methylene chloride for photoresists developed with solvent-type solutions. In the final process step according to FIG. 3(g), the uncovered, etched lines of the metal tracks are dyed, particularly black—for example, by galvanizing the workpiece in a metal bath comprising nickel, with appropriate chemical additives for reducing the grain of nickel. Suitable additives of this kind comprise, for example, compositions containing 70 g of nickel sulfate per liter of $H_2O$, 35 g of nickel ammonium sulfate per liter of $H_2O$, 35 g of zinc sulfate per liter of $H_2O$, and 20 g of sodium thiocyanate per liter of $H_2O$. During this procedure, fine-grain, matt-black nickel is deposited on the uncovered, etched metal tracks, for example, of copper. Dyeing can also be carried out without current, by introducing the workpiece into a sodium chlorite solution containing trisodium phosphate and sodium hydroxide. The etched, uncovered copper tracks are coated, without current, with a black oxide layer having a thickness of 1 to 2 $\mu$m in such a solution. After they are dyed, these copper tracks are provided with a protective coating, for example, by applying a protective coating of silicate.

Figure 4:
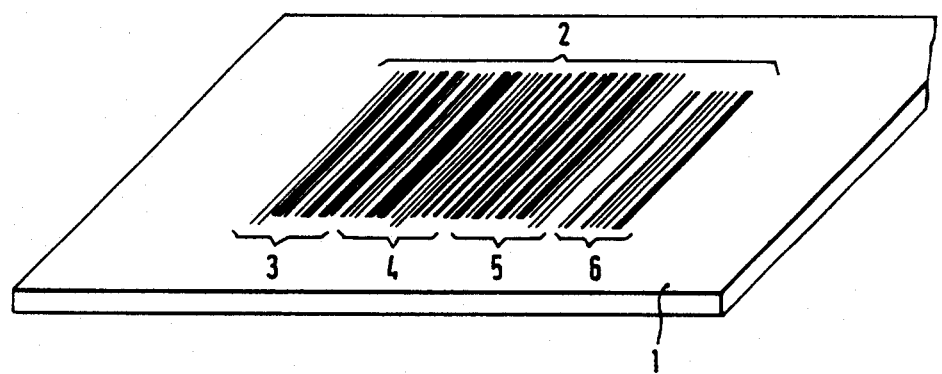
FIG. 4 shows a perspective view of a standard calibration and test element.

FIG. 4 shows a perspective view of a standard calibration and test element which has been produced by the process described above. The ceramic substrate 1 comprises an aluminum oxide ceramic which has a proportion of 96 to 97% of $Al_2O_3$. The thickness of the ceramic substrate 1 is 0.635 mm. Further ceramic substrates having a thickness of 1.016 mm to 1.270 mm are available. Of course, ceramic substances having thicknesses other than those stated can also be produced. The dimensions of the ceramic substrate 1 extend from a 20 mm edge length to a size of about 100×100 mm, and are particularly in the range of about 50×50 mm. A pattern in the form of a matt-black bar pattern 2, which contains several identification fields 3, 4, 5, 6, . . . , of which each has a pre-specified code, is arranged on the surface of the ceramic substrate. The arrangement and sequence of the identification fields correspond, for example, to the code of the EUROPEAN ARTICLE NUMBERING, (or EAN code) or the code of the JAPANESE ARTICLE NUMBERING (or JAN bar code) which, with the exception of the country identification, essentially matches the EAN bar code. Of course, the arrangement and sequence of the identification fields can also correspond to another standardized bar code. If the standard calibration and test element is designed for one of the above mentioned bar codes, the codes in the individual identification fields are standardized, for example, in such a fashion that the numbers 0 to 9 are contained in the individual identification fields in an increasing or decreasing sequence. It is also conceivable for only the number zero or one other number between 1 and 9 to be located in each identification field.

The ceramic substrate 1 of the standard calibration and test element has mechanical and optical properties which are substantially independent of temperature, so that the dimensions of the element are constant over large temperature ranges. The process for application of the pattern onto the surface of the element ensures that the dimensional accuracy of the bar codes, the optical properties, the thickness of the stripes or bars and the separations between the individual bars remain unaltered over long periods of time and thus satisfy all the demands on a standard element.

The standard calibration and test element can also be employed for densitometric measurements in printing and reproduction technology. The pattern on the surface of the ceramic substrate 1 then comprises groups of grids; grid, star and bar scales; groups of lines, angle scales, grids of points, or a combination of such test scales, of which some are indicated schematically in the section of the test chart according to FIG. 2.

A standard calibration and test element for bar codes according to the invention is used, for example, in such a fashion that daily at the start of work of each test instrument or each data register which incorporates a scanner or which is connected to a light pen, the reading accuracy of the device is tested by scanning the standard calibration and test element and testing whether the scanner or light pen correctly reproduces the standard imprinted on the standard element. Each data register or test instrument is only ready for operation after the so-called calibration process. By appropriate programming of the data registers and test instruments, it can be achieved that these are operable only after successful checking using the standard element.

What is claimed is:

1. A process for the production of a standard calibration and test element for calibration and testing of reading and measuring instruments, comprising the steps of:
   (i) applying a metal coating to at least one surface of a ceramic substrate;
   (ii) degreasing the surface of said metal coating;
   (iii) applying a photoresist coating to said degreased surface of said metal coating;
   (iv) exposing said photoresist coating through a mask comprising an image of radiation-transparent and radiation-nontransparent zones of a pattern to be transferred;
   (v) developing said exposed photoresist to thereby produce first zones in which the metal coating remains covered by said photoresist and second zones in which the metal coating becomes uncovered;
   (vi) etching said uncovered zones of said metal coating;
   (vii) removing said photoresist coating from said covered zones and producing thereby etched zones and non-etched zones in said metal coating; and
   (viii) dying said etched zones of said metal coating matt black.

2. A process as claimed in claim 1, wherein the metal coating is applied by sputtering or vapor deposition in vacuo.

3. A process as claimed in claim 1, wherein the metal coating is applied by a chemically depositing metal bath.

4. A process as claimed in claim 3, wherein said chemically depositing metal bath comprises an electroless copper bath.

5. A process as claimed in claim 1, wherein said photoresist comprises a positive photoresist.

6. A process as claimed in claim 1, wherein the etching of the metal coating is performed by a solution comprising metal chloride.

7. A process as claimed in claim 6, wherein said metal chloride comprises iron (III) chloride.

8. A process as claimed in claim 1, wherein the etching is performed by a solution comprising ammoniacal copper.

9. A process as claimed in claim 1, wherein the etched metal zones are dyed by galvanization with fine-grain matt nickel in a metal bath comprising nickel and chemical additives for reducing the grain of nickel.

10. A process as claimed in claim 1, wherein the etched metal zones are dyed by coating with a black oxide coating in a solution comprising sodium chlorite, trisodium phosphate and sodium hydroxide.

11. A process as claimed in claim 10, wherein said black oxide coating has a thickness from about 1 to 2 $\mu$m.

12. A process as claimed in claim 1, further comprising the step:
   (ix) applying a protective coating of silicate to the surface of said dyed metal coating.

13. A standard calibration and test element, produced by a process as claimed in claim 1, comprising
   a ceramic substrate and a metal coating on at least one surface of said ceramic substrate, wherein said ceramic substrate is comprised of at least about 96% by weight of $Al_2O_3$, calculated on total weight of said ceramic substrate, and wherein said metal coating carries a pattern on its surface.

14. A test element as claimed in claim 13, wherein said ceramic substrate is produced by dry pressing or punching from a ceramic block.

15. A test element as claimed in claim 13, wherein said ceramic substrate is produced by laser working.

16. A test element as claimed in claim 13, wherein said ceramic substrate has a thickness from about 0.635 to about 1.27 mm.

17. A test element as claimed in claim 13, having an edge length lying within the range of from about 20 to 100 mm.

18. A test element as claimed in claim 13, wherein said metal coating has a thickness of up to about 5 $\mu$m.

19. A test element as claimed in claim 18, wherein said metal coating has a thickness of up to about 3 $\mu$m.

20. A test element as claimed in claim 13, wherein said pattern is arranged in the form of a matt-black bar pattern, said bar pattern being divided into several identification fields, each of said identification fields comprising a pre-specified code.

21. A test element as claimed in claim 20, wherein the arrangement and sequence of said identification fields corresponds to the code of the European Article Numbering (EAN bar code).

22. A test element as claimed in claim 20, wherein the arrangement and sequence of said identification fields corresponds to the code of the Japanese Article Numbering (JAN bar code).

23. A test element as claimed in claim 20, wherein the arrangement and sequence of said identification fields corresponds to a standardized bar code.

24. A test element as claimed in claim 13, wherein said pattern comprises groups of grids, grid scales, star scales, bar scales, groups of lines, angle scales, grids of points or a combination of said test scales.

25. A method of testing and calibrating the reading accuracy of a scanner incorporated into a test instrument or data register comprising the steps of:
   scanning a standard calibration and test element as defined in claim 13; and
   testing whether the scanner or light pen correctly reproduces the standard imprinted on said standard test element.

* * * * *